(12) United States Patent
Jeddeloh

(10) Patent No.: US 6,789,168 B2
(45) Date of Patent: Sep. 7, 2004

(54) EMBEDDED DRAM CACHE

(75) Inventor: Joseph M. Jeddeloh, Minneapolis, MN (US)

(73) Assignee: Micron Technology, Inc., Boise, ID (US)

( * ) Notice: Subject to any disclaimer, the term of this patent is extended or adjusted under 35 U.S.C. 154(b) by 74 days.

(21) Appl. No.: 09/903,624

(22) Filed: Jul. 13, 2001

(65) Prior Publication Data

US 2003/0014590 A1 Jan. 16, 2003

(51) Int. Cl.$^7$ .............................................. G06F 12/00
(52) U.S. Cl. ........................ 711/122; 711/158; 711/167; 711/168
(58) Field of Search ............................... 711/122, 158, 711/167, 168

(56) References Cited

U.S. PATENT DOCUMENTS

| | | | | |
|---|---|---|---|---|
| 4,169,284 A | * | 9/1979 | Hogan et al. | ................ 711/140 |
| 4,442,487 A | * | 4/1984 | Fletcher et al. | ............. 711/122 |
| 5,675,765 A | * | 10/1997 | Malamy et al. | ............. 711/146 |
| 5,829,026 A | | 10/1998 | Leung et al. | |
| 5,895,487 A | | 4/1999 | Boyd et al. | |
| 6,006,310 A | | 12/1999 | Klein | |
| 6,018,792 A | | 1/2000 | Jeddeloh et al. | |
| 6,038,647 A | * | 3/2000 | Shimizu | ...................... 711/168 |
| 6,073,212 A | | 6/2000 | Hayes et al. | |
| 6,122,709 A | | 9/2000 | Wicki et al. | |
| 6,128,700 A | | 10/2000 | Hsu et al. | |
| 6,195,729 B1 | | 2/2001 | Arimilli et al. | |
| 6,208,273 B1 | * | 3/2001 | Dye et al. | ...................... 341/51 |
| 6,353,569 B1 | * | 3/2002 | Mizuno et al. | ............. 365/210 |

* cited by examiner

Primary Examiner—Mano Padmanabhan
Assistant Examiner—Mehdi Namazi
(74) Attorney, Agent, or Firm—Dickstein Shapiro Morin & Oshinsky LLP

(57) ABSTRACT

A large level three (L3) cache is integrated within the system chipset. The L3 cache is comprised of multiple embedded memory cache arrays. Each array is accessible independently of each other, providing parallel access to the L3 cache. By placing the L3 cache within the chipset, it is closer to the system processor with respect to the system memory. By using independent arrays, the L3 cache can handle numerous simultaneous requests. This reduces average memory latency and thus, increases system bandwidth and overall performance. By using embedded memory, the L3 cache can be implemented on the chipset and be much larger than the L1 and L2 caches without substantially increasing the size of the chipset and system.

21 Claims, 3 Drawing Sheets

EMBEDDED DRAM CACHE

FIELD OF THE INVENTION

The present invention relates generally to cache memory structures for a processor based system and, more particularly, to an apparatus that utilizes embedded dynamic random access memory (eDRAM) as a level three (L3) cache in the system chipset of a processor based system.

BACKGROUND OF THE INVENTION

The ability of processors to execute instructions has typically outpaced the ability of memory systems to supply the instructions and data to the processors. Due to the discrepancy in the operating speeds of the processors and system memory, the processor system's memory hierarchy plays a major role in determining the actual performance of the system. Most of today's memory hierarchies utilize cache memory in an attempt to minimize memory access latencies.

Cache memory is used to provide faster access to frequently used instructions and data, which helps improve the overall performance of the system. Cache technology is based on the premise that programs frequently reuse the same instructions and data. When data is read from main memory, a copy is usually saved in the cache memory (a cache tag is usually updated as well). The cache then monitors subsequent requests for data (and instructions) to see if the requested information has already been stored in the cache. If the data has been stored in the cache, it is delivered with low latency to the processor. If, on the other hand, the information is not in the cache, it must be fetched at a much higher latency from the system main memory.

In more advanced processor based systems, there are multiple levels (usually two levels) of cache memory. The levels are organized such that a small amount of very high speed memory is placed close to the processor while denser, slower memory is placed further away. In the memory hierarchy, the closer to the processor that the data resides, the higher the performance of the memory and the overall system. When data is not found in the highest level of the hierarchy and a miss occurs, the data must be accessed from a lower level of the memory hierarchy. Since each level contains increased amounts of storage, the probability increases that the data will be found. However, each level typically increases the latency or number of cycles it takes to transfer the data to the processor.

The first cache level, or level one (L1) cache, is typically the fastest memory in the system and is usually integrated on the same chip as the processor. The L1 cache is faster because it is integrated with the processor, which avoids delays associated with transmitting information to, and receiving information from, an external chip. The lone caveat is that the L1 cache must be small (e.g., 32 Kb in the Intel® Pentium® III processor, 128 Kb in the AMD Athlon™ processor) since it resides on the same die as the processor.

A second cache level, or level 2 (L2) cache, is typically located on a different chip than the processor and has a larger capacity then the L1 cache (e.g., 512 Kb in the Intel® Pentium® III and AMD Athlon™ processors). The L2 cache is slower than the L1 cache, but because it is relatively close to the processor, it is still many times faster than the main system memory. Recently, small L2 cache memories have been placed on the same chip as the processor to speed up the performance of L2 cache memory accesses.

Many current processor systems consist of a processor with an on-chip L1 static random access memory (SRAM) cache and a separate off-chip L2 SRAM cache. In some systems, a small L2 SRAM cache has been moved onto the same chip as the processor and L1 cache, in which case the reduced latency is traded for a smaller L2 cache size. In other systems, the size of the L1 cache has been increased by moving it onto a separate chip, thus trading off a larger L1 cache for increased latency and reduced bandwidth that result from off chip accesses. These options are attempts to achieve the highest system performance by optimizing the memory hierarchy. In each case, various tradeoffs between size, latency, and bandwidth are made in an attempt to deal with the conflicting requirements of obtaining more, faster, and closer memory.

FIG. 1 illustrates a typical processor based system 10 having a memory hierarchy with two levels of cache memory. The system 10 includes a processor 20 having an on-board L1 cache 22. The processor 20 is coupled to an off-chip or external L2 cache 24. The system 10 includes a system chipset comprised of a north bridge 60 and a south bridge 80. As known in the art, the chipset is the functional core of the system 10. As will be described below, the bridges 60, 80 are used to connect two or more busses and are responsible for routing information to and from the processor 20 and the other devices in the system 10 over the busses they are connected to.

The north bridge 60 contains a PCI (peripheral component interconnect) to AGP (accelerated graphics port) interface 62, a PCI to PCI interface 64 and a host to PCI interface 66. Typically, the processor 20 is referred to as the host and is connected to the north bridge 60 via a host bus 30. The system 10 includes a system memory 50 connected to the north bridge 60 via a memory bus 34. The typical system 10 may also include an AGP device 52, such as e.g., a graphics card, connected to the north bridge 60 via an AGP bus 32. Furthermore, the typical system 10 may include a PCI device 56 connected to the north bridge 60 via a PCI bus $36_a$.

The north bridge 60 is typically connected to the south bridge 80 via a PCI bus $36_b$. The PCI busses $36_a$, $36_b$ may be individual busses or may be part of the same bus if so desired. The south bridge 80 usually contains a real-time clock (RTC) 82, power management component 84 and the legacy components 86 (e.g., floppy disk controller and certain DMA (direct memory access) and CMOS (complimentary metal-oxide semiconductor) memory registers) of the system 10. Although not illustrated, the south bridge 80 may also contain interrupt controllers, such as the input/output (I/O) APIC (advanced programmable interrupt controller).

The south bridge 80 may be connected to a USB (universal serial bus) device 92 via a USB bus 38, an IDE (integrated drive electronics) device 90 via an IDE bus 40, and/or an LPC (low pin count) device 94 via an LPC/ISA (industry standard architecture) bus 42. The system's BIOS (basic input/output system) ROM 96 (read only memory) is also connected to the south bridge 80 via the LPC/ISA bus 42. The BIOS ROM 96 contains, among other things, the set of instructions that initialize the processor 20 and other components in the system 10. Examples of a USB device 92 include a scanner or a printer. Examples of an IDE device 90 include a floppy disk or hard drives and an examples of LPC devices 94 include various controllers and recording devices. It should be appreciated that the type of device connected to the south bridge 80 is system dependent.

As can be seen from FIG. 1, when the processor 20 can not access information from one of the two caches 22, 24, it is forced to access the information from the system memory 50. This means that at least two buses 30, 34 and the components of the north bridge 60 must be involved to access the information from the system memory 50, which increases the latency of the access. Increased latency reduces the system bandwidth and overall performance. Accordingly, there is a desire and need for a third level of high speed cache memory ("L3 cache") that is closer to the processor 20 with respect to the system memory 50. Moreover, it is desirable that the L3 cache be much larger than the L1 and L2 caches 22, 24, yet does not substantially increase the size of the system 10.

Additionally, it should be noted that memory access times are further compounded when other devices e.g., AGP device 52 or PCI device 56 are competing with the processor 20 by simultaneously requesting information from the cache and system memories. Accordingly, there is a desire and need for an L3 cache that allows several requesting devices to access its contents simultaneously.

SUMMARY OF THE INVENTION

The present invention provides a third level of high speed cache memory (L3 cache) for a processor based system that is closer to the system processor with respect to the system memory, which reduces average memory latency and thus, increases system bandwidth and overall performance.

The present invention also provides an L3 cache for a processor based system that is much larger than the L1 and L2 caches, yet does not substantially increase the size of the system.

The present invention further provides an L3 cache for a processor based system that allows several requesting devices of the system to simultaneously access the contents of the L3 cache.

The above and other features and advantages are achieved by a large L3 cache that is integrated within the system chipset. The L3 cache is comprised of multiple embedded memory cache arrays. Each array is accessible independently of each other, providing parallel access to the L3 cache. By placing the L3 cache within the chipset, it is closer to the system processor with respect to the system memory. By using independent arrays, the L3 cache can handle numerous simultaneous requests. This reduces average memory latency and thus, increases system bandwidth and overall performance. By using embedded memory, the L3 cache can be implemented on the chipset and be much larger than the L1 and L2 caches without substantially increasing the size of the chipset and system.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF PREFERRED EMBODIMENTS

Figure 1:
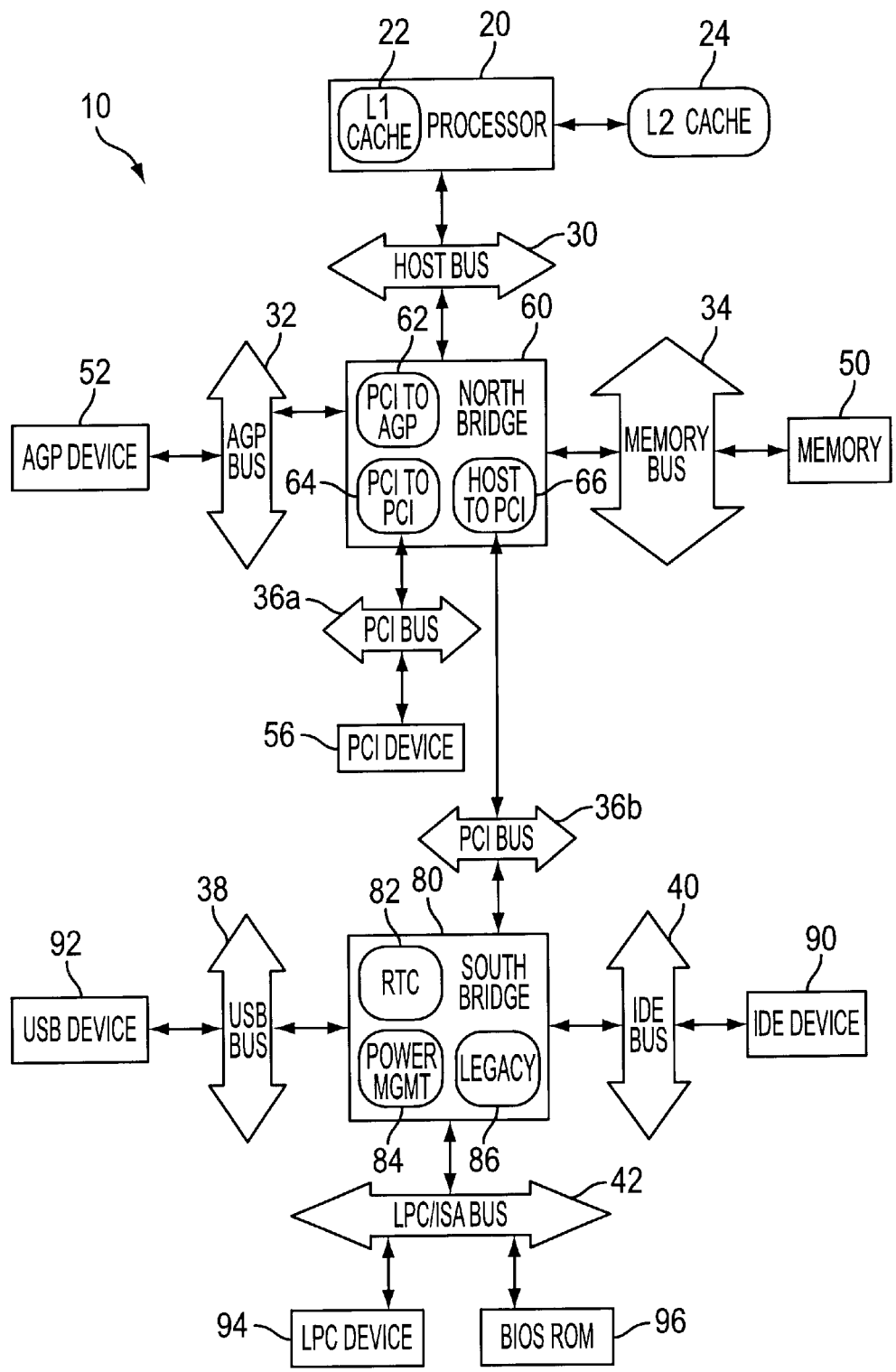
FIG. 1 illustrates a typical processor based system having a memory hierarchy with two levels of cache memory.
Figure 2:
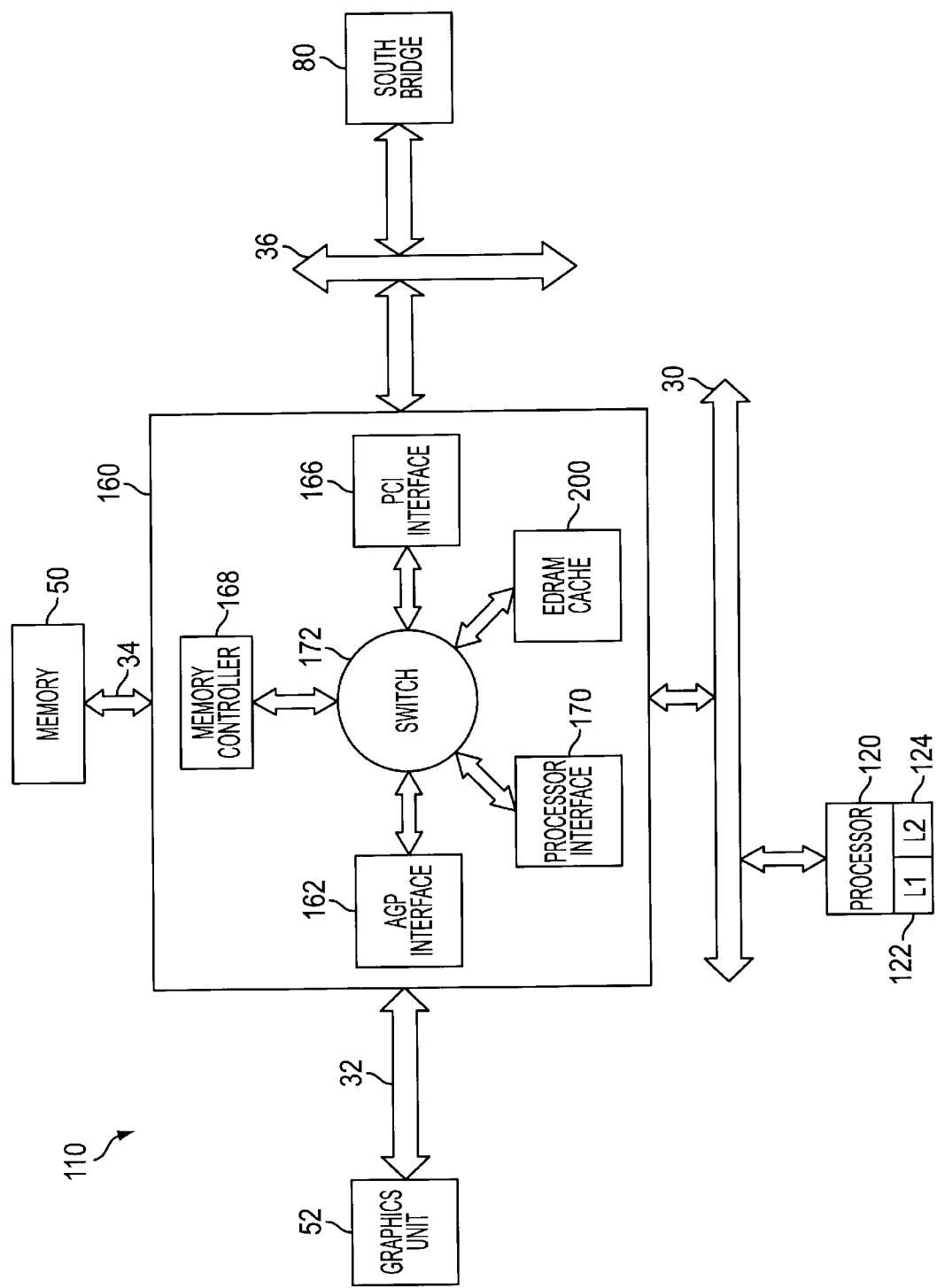
FIG. 2 is a block diagram illustrating a portion of a processor based system having an eDRAM L3 cache integrated on the system chipset constructed in accordance with an exemplary embodiment of the present invention.

FIG. 2 illustrates a portion of a processor based system 110 having an eDRAM L3 cache 200 integrated on the system chipset constructed in accordance with an exemplary embodiment of the present invention. The system 110 includes a south bridge 80 and a north bridge 160. The south bridge 80 is connected to a north bridge 160 via a bus such as a PCI bus 36. The north and south bridges comprise the system chipset for the system 110. Although not illustrated, the system 110 also includes the typical components connected to the south bridge 80 as illustrated in FIG. 1. The south bridge components are not illustrated solely for clarity purposes of FIG. 2.

In the illustrated embodiment, the L3 cache 200 is integrated on the north bridge 160 of the system chipset. As such, the L3 cache is positioned closer to the processor 120 in comparison to the system memory 50. For example, the processor 120 can access the L3 cache 200 without having to send or receive information over the memory bus 34 (it only has to send/receive information over the host bus 30). As will become apparent from the following allows multiple devices (e.g., device 52, processor 120) to access the cache 200 at the same time. Furthermore, in a preferred embodiment, the L3 cache 200 comprises eDRAM arrays, which allows it to be larger then the L1 and L2 caches 122, 124 without substantially increasing the size of the system chipset.

The north bridge 160 is also connected to a graphics device/unit 52 via an AGP bus 32, the system memory 50 via the memory bus 34, and the processor 120 via the host bus 30. In the illustrated embodiment, the processor 120 contains on-board or integrated L1 and L2 caches 122, 124. The L1 cache 122 may be e.g., 128 Kb and the L2 cache 124 may be e.g., 512 Kb. It should be appreciated that the size of the L1 and L2 caches 122, 124 is purely exemplary and is not important to practice the present invention. Thus, the invention is not to be limited to particular sizes of the L1 and L2 caches 122, 124. All that is required to practice the invention is that the pertinent system components (e.g., processor 120) realize that the memory hierarchy comprises three levels of cache and that the L3 cache 200 is integrated on the system chipset and is constructed as described below.

In addition to the L3 cache 200, the north bridge 160 may include an AGP interface 162, a memory controller 168, PCI interface 166 and processor interface 170. The L3 cache 200, AGP interface 162, memory controller 168, PCI interface 166 and processor interface 170 are each coupled to a switch 172, which allows information to be passed between these components and the outside devices and buses. The L3 cache 200 is tied directly to the processor interface 170, which reduces the latency of accesses to the cache 200. As noted above, the L3 cache 200 is comprised of multiple independent eDRAM arrays, which allows multiple devices to access the L3 cache 200 at the same time. Moreover, by using eDRAM arrays, the L3 cache 200 is much smaller than the typical SRAM implemented cache. The L3 cache 200 is described in detail with respect to FIG. 3.

Figure 3:
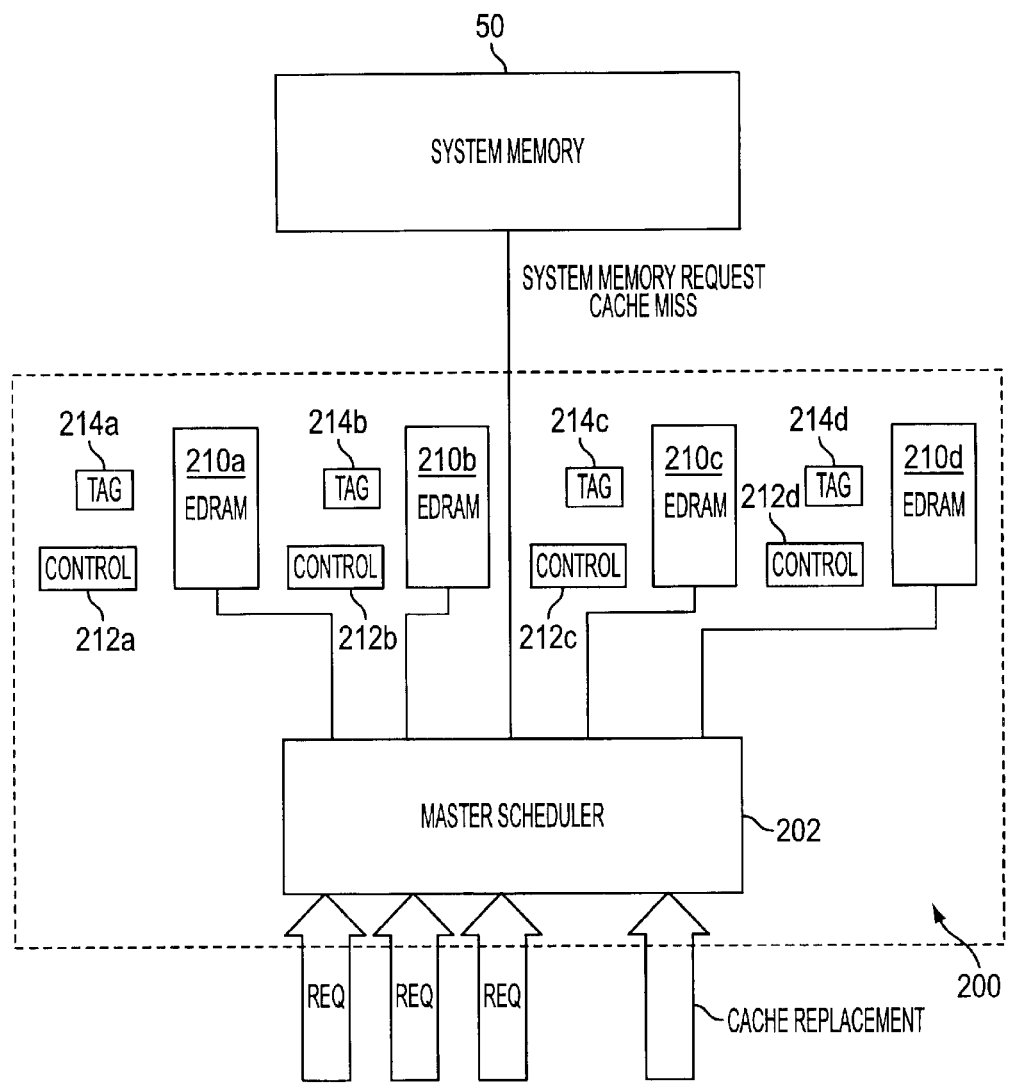
FIG. 3 is a block diagram illustrating an exemplary eDRAM cache utilized in the system illustrated in FIG. 2.

FIG. 3 is a block diagram illustrating an exemplary L3 cache 200 utilized in the system 110 of FIG. 2. For illustration purposes only, the L3 cache 200 is shown as being directly connected to the system memory 50. It should be appreciated, however, that the L3 cache 200 is connected to the system memory 50 through the switch 172, memory controller 168 and memory bus 34 as shown in FIG. 1 or by any other arrangement deemed suitable for this connection.

The L3 cache 200 comprises a plurality of eDRAM arrays 210$_a$, 210$_b$, 210$_c$, 210$_d$ (collectively referred to herein as "eDRAM arrays 210"). Although FIG. 3 illustrates four eDRAM arrays 210, it should be appreciated that any number of arrays 210 can be used to practice the invention and the number of arrays 210 is application specific. In one desired embodiment, the L3 cache 200 includes eight independent one Mb eDRAM arrays 210, with each array 210 being 128 bits wide. Thus, in one embodiment, the L3 cache 200 size is eight Mb, which is substantially larger than the L1 and L2 cache sizes of 128 Kb and 512 Kb, respectively.

It is desired that each array $210_a$, $210_b$, $210_c$, $210_d$ have its own local memory controller $212_a$, $212_b$, $212_c$, $212_d$ (collectively referred to herein as "controllers 212"). The controller 212 include logic to access the arrays 210 and to perform DRAM operations such as e.g., refresh. In one embodiment, the L3 cache 200 is a direct mapped cache, with each array $210_a$, $210_b$, $210_c$, $210_d$ being associated with a respective tag array $214_a$, $214_b$, $214_c$, $214_d$ (collectively referred to herein as "tag arrays 214"). The tag arrays 214 may be implemented with eDRAM also, but other types of memory may be used if desired.

Each entry in the cache 200 is accessed by an address tag stored in the tag arrays 214. As is known in the art, in a direct mapped cache, each main memory address maps to a unique location within the cache. Thus, if the L3 cache 200 is implemented as a direct mapped cache, the addresses from the system memory 50 are given unique addresses in the L3 cache 200. Because each array $210_a$, $210_b$, $210_c$, $210_d$ has its own controller $212_a$, $212_b$, $212_c$, $212_d$ and tag array $214_a$, $214_b$, $214_c$, $214_d$, they are independently accessible. Essentially, the L3 cache 200 comprises a plurality of independent direct mapped caches. It should be appreciated that the L3 cache 200 could be configured to be a fully associative (i.e., main memory addresses can correspond to any cache location) or set associative (i.e., each address tag corresponds to a set of cache location) cache memory if so desired and if space is available on the chipset.

A master scheduler 202 is connected to the eDRAM arrays 210 and servers as the controller of the cache 200. Multiple requests REQ are allowed to enter the master scheduler 202, which is responsible for resolving resource conflicts within the cache 200. In essence, the scheduler 202 serves as a cross-bar controller for the multiple requesters trying to gain access into the cache 200 and for the eDRAM arrays 210 trying to output information to the requesters. The use of independent arrays 210 and the scheduler 202 reduces bank conflict and read/write turnarounds. The arrays 210 also allow for multiple pages of memory to be kept open, which also reduces latency. Moreover, traffic from several I/O streams, AGP devices, the processor, etc. can be handled concurrently.

In operation, when a request REQ is received and a given eDRAM array 210 is free, a tag lookup determines if there is a cache hit or miss. If there is a cache hit, the local controller 212 accesses the associated eDRAM array 210 and outputs the data to the scheduler 202. The master scheduler 202 then routes the data to the appropriate requester. Thus, the architecture of the cache 200 maximizes system through put. If, on the other hand, a cache miss is detected, the request REQ is forwarded to the system memory 50. The data is returned from the system memory 50 and a cache tag update is scheduled.

It should be noted that the L3 cache 200 will implement cache replacement (triggered by a cache replacement request CACHE REPLACEMENT) and eviction methods when needed. Any method of performing cache replacement and eviction can be utilized by the present invention and thus, the invention should not be limited in any way to any particular method for doing so.

Thus, referring to FIGS. 2 and 3, the present invention provides a large L3 cache 200 that is integrated within the system chipset. In a preferred embodiment, the cache 200 is integrated on the same chip as the north bridge 160. The L3 cache 200 is comprised of multiple embedded memory cache arrays 210. Each array 210 is accessible independently of each other, providing parallel access to the L3 cache 200. By placing the L3 cache 200 within the chipset, it is closer to the system processor 120 with respect to the system memory 50. By using independent arrays 210, the L3 cache 200 can handle numerous simultaneous requests REQ. These features reduce average memory latency and thus, increase system bandwidth and overall performance. By using embedded memory, the L3 cache 200 can be implemented on the chipset and be much larger than the L1 and L2 caches 122, 124 without substantially increasing the size of the chipset and system 110.

In one exemplary embodiment, the L3 cache 200 is eight Mbytes of eDRAM and is constructed of eight independent one Mbyte eDRAM arrays 210. Each array 210, for example, can be 128 bits wide and operate at a 200 MHz, which means that each array 210 can provide 3.2 giga-bytes of information per second Each array 210 has its own local memory controller 212. One central controller manages conflicts between arrays. The L3 cache 200 is directly mapped with a tag array 214 associated with each eDRAM array 210. This allows for independent tag look ups for each array 210, which allows for multiple requestors to access the cache 200 concurrently. The independent arrays 210 also reduce bank conflict and read/write turnarounds. Thus, traffic to/from multiple requestors can be handled concurrently.

The present invention has been described using eDRAM arrays 210 because substantially larger eDRAM arrays can be implemented in the system chipset in comparison to other types of memory (e.g., SRAM). It should be noted that other types of embedded memory could be used in the L3 cache 200 if desired. Although the invention has been described using an eight Mb L3 cache 200 with 1 Mb eDRAM arrays 210, the L3 cache 200 of present invention may be sixteen Mb or any other size that would increase the performance of the system without adversely impacting the size of the chipset. The sizes of the arrays 210 may also be modified as required to increase the performance of the system. Furthermore, although described with reference to a single processor 120, the above invention may be implemented in a multiple processor system.

While the invention has been described and illustrated with reference to exemplary embodiments, many variations can be made and equivalents substituted without departing from the spirit or scope of the invention. Accordingly, the invention is not to be understood as being limited by the foregoing description, but is only limited by the scope of the appended claims.

What is claimed as new and desired to be protected by Letters Patent of the United States is:

1. An integrated circuit for use with a processor system, said integrated circuit comprising:

a memory controller for controlling a system memory of the processor system;

a processor interface coupled to said memory controller, said processor interface for transmitting information between a processor and the system memory;

a level three cache memory coupled to said memory controller and said processor interface, said level three cache memory comprising at least two independently accessible memory arrays that may be accessed independently and concurrently by the processor and other components of the system; and a master scheduler, said master scheduler processing requests for information from the processor and other components, forwarding information from said memory arrays to the processor and the other components, and resolving conflicts between said memory arrays.

2. The integrated circuit of claim 1, wherein each memory array of said level three cache memory comprises embedded memory.

3. An integrated circuit for use with a processor system, said integrated circuit comprising:

a memory controller for controlling a system memory of the processor system;

a processor interface coupled to said memory controller, said processor interface for transmitting information between a processor and the system memory, the processor communicating with level one and level two cache memories; and a level three cache memory coupled to said memory controller and said processor interface, said level three cache memory comprising at least two independently accessible memory arrays connected to a respective local memory controller and tag array that may be accessed independently and concurrently by the processor and other components of the system.

4. The integrated circuit of claim 3, wherein each memory array of said level three cache memory is configured as a direct mapped cache memory array.

5. The integrated circuit of claim 1, wherein a number of said memory arrays is eight.

6. A north bridge integrated circuit comprising:

a level three cache memory integrated with and coupled to at least memory controller and a processor interface, said level three cache memory comprising at least one embedded dynamic random access memory array that may be accessed by multiple requesting devices independently and concurrently; and a master scheduler, said master scheduler processing requests for information from a processor and other components, forwarding information from said at least one embedded dynamic random access memory array to the processor and the other components, and resolving conflicts between said embedded dynamic random access memory arrays.

7. The north bridge integrated circuit of claim 6, wherein said cache memory comprises a plurality of embedded dynamic random access memory arrays that are accessible independently and concurrently by components of the system.

8. A north bridge integrated circuit comprising:

a level three cache memory integrated with and coupled to at least a memory controller and a processor interface, said level three cache memory comprising at least one embedded dynamic random access memory array that may be accessed by multiple requesting devices independently and concurrently, wherein each of said at least one array is connected to a respective local memory controller and tag array.

9. The north bridge integrated circuit of claim 8, wherein each of said at least one embedded dynamic random access memory array is configured as a direct mapped cache memory array.

10. The north bridge integrated circuit of claim 6, wherein said level three cache comprises eight embedded dynamic random access memory arrays, each array comprising at least one mega-byte of memory.

11. A processor system comprising:

a processor;

a system memory device; and a north bridge coupled to said processor and said system memory device, said north bridge comprising:

a memory controller for controlling said system memory device;

a processor interface coupled to said memory controller, said processor interface for transmitting information between said processor and said system memory device; and a cache memory coupled to said memory controller and said processor interface, said cache memory comprising at least two independently accessible memory arrays that may be accessed independently and concurrently by the processor and other components of the system; and a master scheduler, said master scheduler processing requests for information from said processor and other components, forwarding information from said memory arrays to said processor and the other components, and resolving conflicts between said memory arrays.

12. A processor system comprising:

a processor;

a system memory device; and a north bridge coupled to said processor and said system memory device, said north bridge comprising:

a memory controller for controlling said system memory device;

a processor interface coupled to said memory controller, said processor interface for transmitting information between said processor and said system memory device; and a cache memory coupled to said memory controller and said processor interface, said cache memory comprising at least two independently accessible memory arrays, wherein each memory array of said cache memory is connected to a respective local memory controller and tag array that may be accessed independently and concurrently by the processor and other components of the system.

13. The system of claim 12, wherein each memory array of said cache memory is configured as a direct mapped cache memory array.

14. The system of claim 11, wherein a number of said memory arrays is eight.

15. The system of claim 11, wherein said processor comprises first and second levels of cache and said cache memory serves as a level three cache for said processor.

16. A processor system comprising:

a processor, said processor including level one and level two cache memories;

a system memory device; and a north bridge integrated circuit coupled to said processor and said system memory device, said north bridge integrated circuit comprising:

a level three cache memory integrated with and coupled to at least memory controller and a processor interface, said level three cache memory comprising at least one embedded dynamic random access memory embedded dynamic random access memory array that may be accessed by multiple requesting devices independently and concurrently; and a master scheduler, said master scheduler processing requests for information from said processor and other components of the system, forwarding information from said embedded dynamic random access memory arrays to said processor and the other components, and resolving conflicts between said embedded dynamic random access memory arrays.

17. The system of claim 16, wherein said level three cache memory comprises a plurality of embedded dynamic random access memory arrays that are accessible independently and concurrently by components of the system.

18. A processor system comprising:

a processor, said processor including level one and level two cache memories;

a system memory device; and a north bridge integrated circuit coupled to said processor and said system memory device, said north bridge integrated circuit comprising:

a level three cache memory integrated with and coupled to at least memory controller and a processor interface, said level three cache memory comprising at least one embedded dynamic random access memory array that may be accessed by multiple requesting devices independently and concurrently, wherein each of said at least one eDRAM array is connected to a respective local memory controller and tag array.

19. The system of claim 18, wherein each of said at least one embedded dynamic random access memory array is configured as a direct mapped cache memory array.

20. The system of claim 16, wherein said level three cache comprises eight embedded dynamic random access memory arrays, each array comprising at least one mega-byte of memory.

21. A processor system comprising:

a processor;

a system memory device; and a north bridge coupled to said processor and said system memory device, said north bridge comprising:

a switch;

a graphics interface connected to said switch;

a peripheral component interchange bus interface connected to said switch;

a memory controller connected to said switch, said memory controller controlling said system memory device;

a processor interface connected to said switch; and a cache memory coupled to said memory controller and said processor interface, said cache memory comprising a plurality of independently and concurrently accessible embedded dynamic random access memory arrays, each embedded dynamic random access memory array being connected to a respective local memory controller and tag array and being configured as a direct mapped cache.

* * * * *